United States Patent
Aakula et al.

(10) Patent No.: US 6,223,049 B1
(45) Date of Patent: Apr. 24, 2001

(54) MOBILE COMMUNICATION SYSTEM IN WHICH A NUMBERING DOMAIN IS DIVIDED INTO BLOCKS BY THE USE OF INDEXING RULES

(75) Inventors: Sirpa Aakula; Jouko Ahvenainen, both of Helsinki (FI)

(73) Assignee: Nikia Telecommunications OY, Espoo (FR)

(*) Notice: Subject to any disclaimer, the term of this patent is extended or adjusted under 35 U.S.C. 154(b) by 0 days.

(21) Appl. No.: 09/142,914
(22) PCT Filed: Mar. 19, 1997
(86) PCT No.: PCT/FI97/00181
§ 371 Date: Dec. 14, 1998
§ 102(e) Date: Dec. 14, 1998
(87) PCT Pub. No.: WO97/35444
PCT Pub. Date: Sep. 25, 1997

(30) Foreign Application Priority Data

Mar. 20, 1996 (FI) .......................................... 961290

(51) Int. Cl.[7] .................................................. H04B 7/00
(52) U.S. Cl. .......................... 455/519; 455/518; 455/521
(58) Field of Search .............................. 455/519, 17, 414, 455/433, 436, 461, 518, 520, 521, 551, 552, 553; 379/207, 220

(56) References Cited

U.S. PATENT DOCUMENTS

| | | | |
|---|---|---|---|
| 5,369,783 | * | 11/1994 | Childress et al. ...................... 455/17 |
| 5,598,458 | * | 1/1997 | Bales et al. ........................... 455/414 |
| 5,608,779 | * | 3/1997 | Lev et al. .............................. 455/436 |
| 5,625,886 | * | 4/1997 | Raes ..................................... 455/519 |
| 5,640,443 | * | 6/1997 | Kamura ................................ 455/433 |
| 5,842,136 | * | 11/1998 | Tuulos ................................. 455/519 |

FOREIGN PATENT DOCUMENTS

| | | |
|---|---|---|
| 526 832 | 2/1993 | (EP) . |
| 530 010 | 3/1993 | (EP) . |
| 630 162 | 12/1994 | (EP) . |
| 96/00480 | 1/1996 | (WO) . |

OTHER PUBLICATIONS

System Interface Specification for radio units to be used with commercial trunked networks operating in Band III sub-bands 1 and 2, MPT 1343 Performance Specification, Jan. 1988.

A Signaling Standard for Trunked Private Land Mobile Radio Systems, MPT 1327, Jan. 1988.

A Technical Overview of the United Kingdom PMR Trunking Standards, Protocall 1327.

* cited by examiner

*Primary Examiner*—Curtis Kuntz
*Assistant Examiner*—Barry W Taylor
(74) *Attorney, Agent, or Firm*—Pillsbury Winthrop LLP

(57) ABSTRACT

A mobile communication system comprising subscribers provided with identifiers (101), one or more mobile exchanges, and a numbering domain allocated to the mobile communication system, the numbering domain comprising subscriber identifiers (101, 103). In the mobile communication system, a predetermined part (104) of the identifier (101, 103) of each subscriber forms an index (104) which refers to a predetermined protocol (106) to be applied to the identifier (103). The protocol (106) consists of one or more rules (108). These rules (108) define variables (111) on the basis of which subscriber identifiers (101, 103) belonging to a predetermined block of the numbering domain are interpreted in a predetermined manner.

10 Claims, 4 Drawing Sheets

Fig. 1

Subsciber number:   *12345678* —101

| *Indexing rule:*  *3 bits from beginning* | —102 |

Index bits:
104— 101 *111000110000101001110B* —103

Numbering domain divided into blocks according to indexing rule:   106

107—   105—

| *Index bits:* (1-N) blocks of numbering domain | *PROTOCOL: e.g. how the subscriber's home exchange is interpreted from the subscriber number and what numbering technique is in use* |
|---|---|
| *000* | |
| *001* | |
| *010* | |
| *011* | |
| *100* | |
| *101* | |
| *110* | |
| *111* Range allocated to system | *Alias numbers, special numbers* |

—108

109  112   110

*PROTOCOL (relating to one block of numbering domain):*   111

| *Rule 1.* | Numbering technique: *continuous numbering  *field-based numbering |
| *Rule 2.* | Method for inferring home exchange |
| *Rule 3.* | Use: *normal numbering  *allocated to system |

Fig. 2

Subscriber number: 12345678 ~ 101

Parameters used by the network: 201
- selecting how many digits } 202
- which digit is first one e.g. two digits, third digit ~ 203

12 / 34 / 5678 ~ 204

Example of subscriber number, 3 and 4 are index numbers. All exchanges have a global table by which the location of the home exchange can be found out.

Global table used by network: contains different blocks of numbering domain formed by index numbers obtained from subscriber numbers and allocation of blocks to network exchanges

Fig. 3

| Division of numbering domain formed by index numbers into slices 101<br>example: 12 / 34 / 5678<br>i.e. 2 numbers → numbering domain in use 00-99 | blocks → home exchange |
|---|---|
| 00-15 | 3 |
| 16-20 | 5 |
| 21-66 | 1 |
| 67-99 | 3 |

301 302

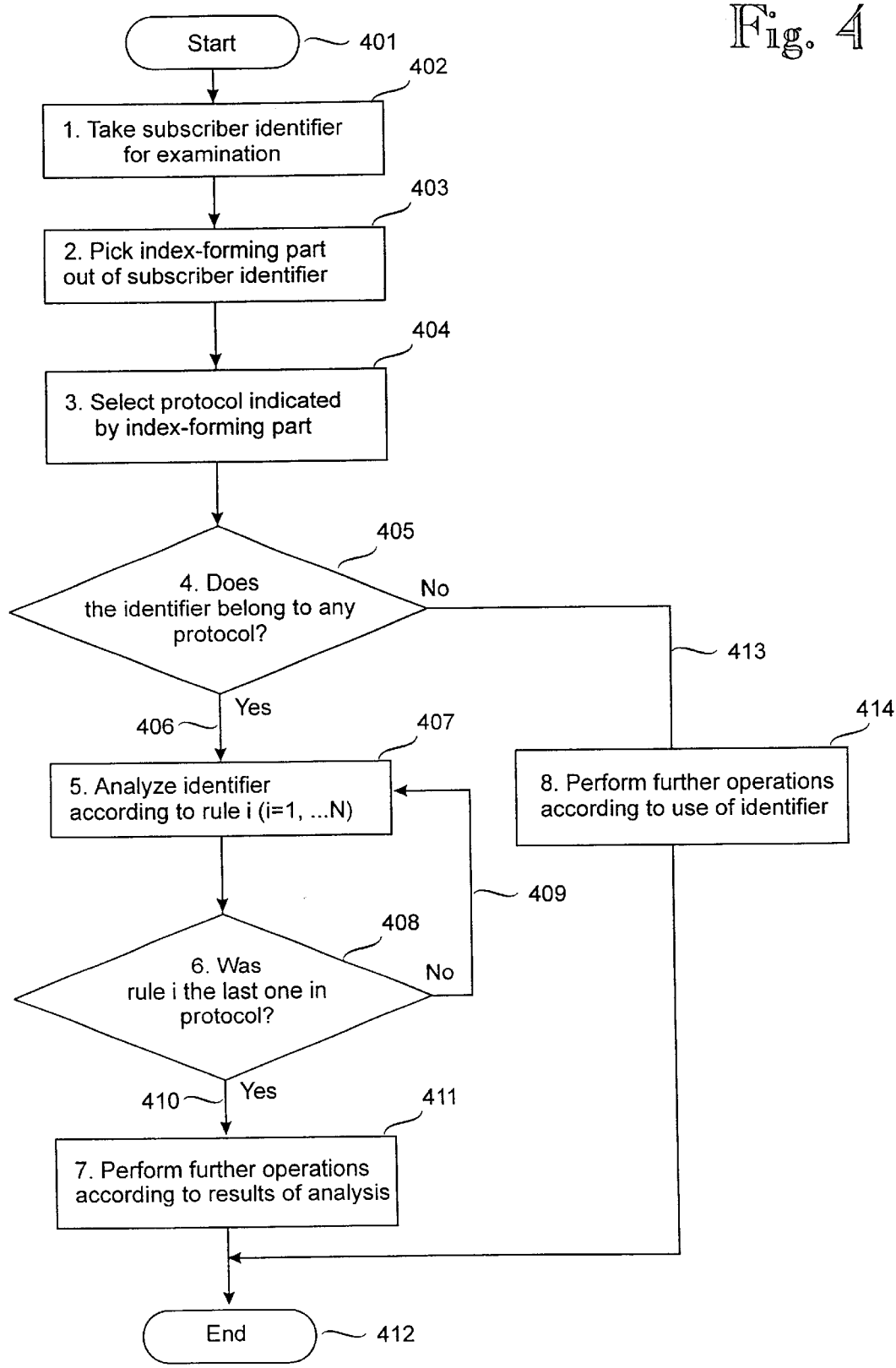

MOBILE COMMUNICATION SYSTEM IN WHICH A NUMBERING DOMAIN IS DIVIDED INTO BLOCKS BY THE USE OF INDEXING RULES

This application is the national phase of international application PCT/FI97/00181 filed Mar. 19, 1997 which designated the U.S.

FIELD OF THE INVENTION

The invention relates to a mobile communication system comprising subscribers provided with identifiers, one or more mobile exchanges, and a numbering domain allocated to the mobile communication system, said numbering domain comprising subscriber identifiers.

The invention relates to mobile communication systems, particularly to mobile communication systems comprising, for example, as shown in FIG. 5, control exchanges, 1 and 2 base stations BS1, BS2 and BS3 and radio telephones, i.e. mobile stations, or subscribers, MS1, MS2, and MS3 and subscriber data bases. The system may have a cellular structure, in which case each cell 1, C2 and C3 comprises at least one base station communicating with at least one mobile station over one or more radio channels.

The method of the invention is intended for use particularly in trunked networks, which are typically company networks or public safety and security networks, in which the channels are allocated to one or more companies or authority organizations.

BACKGROUND OF THE INVENTION

The invention is applicable in mobile communication systems with either digital or analog radio paths. Analog mobile communication systems are disclosed, for example, in MPT 1327, *A Signalling Standard for Trunked Private Land Mobile Radio Systems*, January 1988, revised and reprinted November 1991, and MPT 1343, *Performance Specification*, January 1988, revised and reprinted September 1991, both issued by the Radio-communications Agency, published by the British Department of Trade and Industry. Digital mobile communication systems are disclosed, for example, in ETS 300 392-1, February 1996, *Radio Equipment and Systems; Trans-European Trunked Radio (TETRA); Voice plus Data (V+D); Part 1: General network design*, ETSI, 195 pages.

A radio network may comprise a plurality of exchanges, and one system often comprises a plurality of organizations with different needs concerning subscriber numbering.

In order to ensure an individual subscriber number for each subscriber in a radio network, the entire mobile communication system typically uses a common numbering domain. A radio network, particularly a PMR (Private Mobile Radio) network, is typically used by many organizations, which want to use the subscriber identifiers, e.g. numbers, in their own way.

In a fixed telephone network, subscriber numbers are assigned to users in such a way that the numbering domain is divided between different exchanges, and the subscriber of a certain exchange is assigned a subscriber number from the block of the numbering domain allocated to that exchange. In such a case, the block, or part, of the numbering domain allocated to the organizations is not necessarily continuous, but different identifiers must be assigned to subscribers located in the service areas of different exchanges. The identifiers thus show that the subscribers are located in the service areas of different exchanges.

Organizations naturally wish to be allocated a continuous block of the numbering domain irrespective of in which exchanges data of their subscribers are located. On the other hand, when the system comprises a plurality of organizations, the subscriber numbering must meet the special needs of all the organizations.

Furthermore, sometimes the clients wish that the subscriber number did not directly disclose certain information on the subscriber. Therefore the aim is to find a solution where the subscriber identifier does not directly indicate the organization to which the subscriber in question belongs or his position in that organization.

The problems with cases of the prior art where the radio network comprises a plurality of exchanges sharing the same numbering domain are the allocation of subscriber numbers to the different exchanges, and the location of the home data bases of subscribers in the different exchanges. This is problematic, because there is no applicable way of reading the location of a subscriber's home exchange or subscriber data base from the subscriber number, if subscriber numbers are not allocated exchange-specifically.

Another problem with the solutions of the prior art is that subscriber numbering in fixed telephone networks is directly dependent on the exchange. Subscriber numbers are allocated to users in such a way that the numbering domain is divided between different exchanges, and a subscriber of a certain exchange is assigned a subscriber number from the block of the numbering domain allocated to the exchange.

Furthermore, if subscriber numbering is to be arranged in such a manner that the number does not disclose anything directly (not even the subscriber's home exchange), finding the home data base of a subscriber presents a problem, when the subscriber is visiting the areas of other exchanges.

In a GSM network, home data bases are provided in home location registers HLR. A network may comprise 1 to n HLRs. Usually the HLRs are operator-specific.

BRIEF DESCRIPTION OF THE INVENTION

An object of the present invention is to provide a method for dividing a numbering domain into blocks by the use of indexing rules.

Another object of the invention is to provide a method for flexible and versatile division of a numbering domain in a radio network in order for subscriber numbering to satisfy as many needs of both the mobile communication system and different organizations as possible.

Still another object of the invention is to provide such a method for subscriber numbering in a radio network that allows a subscriber's home exchange to be interpreted on the basis of his subscriber number. It is necessary to find out the subscriber's home exchange, because the subscriber's home data base is located there, i.e. the data base in which the subscriber data are stored, e.g. the subscriber rights and service definitions.

This new type of mobile communication system is achieved with the system of the invention, which is characterized in that a predetermined part of the identifier of each subscriber forms an index which refers to a pre-determined protocol to be applied to said identifier, said protocol consists of one of more rules, and said rules define variables on the basis of which subscriber identifiers belonging to a predetermined block of the numbering domain are interpreted in a predetermined manner.

The invention is based on the idea of dividing a numbering domain into blocks using indirect indexing rules.

The invention comprises defining an index from a subscriber number network-specifically according to predetermined rules, said index being used for placing a subscriber number under a desired protocol. A protocol consists of a set of rules or a set of reasoning rules which allow the system to function in a predetermined way in a specific situation.

The new and characteristic feature of the invention is the possibility of applying a protocol to subscriber numbering without any limits. The invention allows desired rules to be defined separately even for each subscriber number.

The solution allows the numbering domain used by a network to be divided into blocks by applying an indexing rule to a subscriber number to indicate a desired block of the numbering domain unambiguously. The resulting blocks of the numbering domain can be utilized, for example, for defining different rules for inferring home exchanges for the subscriber numbers.

It is not necessary for all user organizations using the system to allocate subscriber data according to the same principles to the exchanges, but the subscriber data can be stored in the memories of different exchanges or subscriber data bases according to the different location areas of the mobile stations/subscribers even if a uniform block of the numbering domain was allocated to the organization in question.

Another feature of the invention is that an index number is defined on the basis of a subscriber number network-specifically according to predetermined rules. The index number is used for finding out the subscriber's home exchange by means of a global table maintained at the exchanges of the network.

To provide flexible subscriber numbering, the numbering domain in the system is divided into blocks by means of an indexing rule. This allows blocks of the numbering domain to be analyzed as independent units, which makes the use of the numbering domain more versatile and freer than e.g. in a physical network, as described above. The location of a subscriber or of his home exchange or home data base does not determine the subscriber identifier directly. Instead, the user organization can determine the subscriber identifier freely and independently of the location of the subscriber or the location of his subscriber or home data base.

An advantage of the method of the invention is that it allows the common numbering domain of a system to be divided into blocks of a desired size.

A further advantage of the invention is that it allows the numbering domain to be used flexibly as described above, and frees the subscriber numbering from the network topology.

Still another advantage of the invention is that it offers unlimited possibilities of applying a protocol—even separately to each subscriber number.

The different blocks of the numbering domain can also be used in field-based numbering for providing a different field division for individual and group numbers.

An advantage of the invention is that it allows different blocks of the numbering domain to be used for implementing different numbering techniques: one block supports continuous numbering and the rest of them support field-based numbering. Continuous numbering refers herein to the feature that the subscriber numbers comprise one field.

Another advantage of the invention is that it allows, for example, separate inference methods to be formed for each block of the numbering domain for finding a subscriber's home exchange and home data base. The invention also allows different field divisions to be provided for subscriber numbers contained in different blocks of the numbering domain.

Yet another advantage of the invention is that it allows an unambiguous block of the numbering domain to be allocated to a mobile communication system for special numbers processed by the system, such as emergency numbers, and numbers of visiting subscribers, i.e. alias numbers. The special feature of alias numbers is that they can be totally different from the actual subscriber numbers.

The above requirement can be satisfied by placing alias numbers and subscriber numbers in different blocks of the numbering domain; 1 to n blocks of the numbering domain are allocated to the system for alias numbers.

A specific advantage of the invention is that it allows a mobile communication system, e.g. a radio network, to interpret the subscriber's home exchange or home data base on the basis of the subscriber number without that the subscriber number is bound to a certain form or to fixed numbers allocated to exchanges and readable directly from the subscriber number.

A further advantage of the invention is that it allows the location data of a subscriber's home data base or another subscriber data base to be concealed in a subscriber number in such a way that the data is indirectly included in the subscriber number, but no unauthorized person is able to find out the location of the data base in question directly on the basis of the subscriber number.

Yet another advantage of the invention is that it allows subscriber data to be positioned in different exchanges without that it affects the subscriber number.

In addition, it is an advantage of the invention that the subscriber numbering of the invention offers a free and continuous block of the numbering domain to be allocated to organizations and the system according to their needs. Such an arrangement saves subscriber numbers, since fixed blocks of the numbering domain do not have to be allocated specifically for each exchange.

A further advantage of the invention is that it allows home data bases of the subscribers to be positioned in a distributed manner in a radio network comprising a plurality of exchanges.

It is also an advantage of the invention that the distribution of the subscribers' home data bases loads the network less and expedites the processing, if subscriber data are stored in the exchanges in which the subscribers normally operate.

Still another advantage of the invention is that it enhances the efficiency of the use of subscriber numbers: the invention allows a number to be positioned physically in any exchange, since the number is not bound to an organization, for example.

An advantage of the invention is that it expedites establishment of a connection and providing of services, since subscriber data and a subscriber data base are stored in the exchange or subscriber data base in the service area of which the subscriber typically moves.

Another advantage of the invention is flexibility, since in the system of the invention subscriber numbers are not bound to organization structures or subscriber (call) rights. This makes it possible to have different types of number structures within one system. It is also an advantage that different numbering solutions can be implemented in different mobile communication systems by means of the same numbering: the solution of the invention offers many possibilities for indicating a home data base, since the home data base can also be indicated by means of an index and rules of the invention, not only on the basis of the subscriber number.

A further advantage of the invention is its security, since in a system of the invention, a subscriber number does not, if so desired (i.e. if the numbering is planned appropriately), disclose any information on the subscriber, such as the position of the subscriber in the organization, the rights of the subscriber, or the location of the subscriber's home data base.

Yet another advantage of the invention is the versatility of the numbering used. In the system of the invention, the structure of the number i.e. whether the number is continuous or divided into fields—can be freely decided.

BRIEF DESCRIPTION OF THE DRAWINGS

In the following, the invention will be described in greater detail with reference to the accompanying drawings, in which FIG. 1 shows an arrangement of the invention for interpreting subscriber identifiers, FIG. 2 shows an example illustrating how the location of a home exchange or a subscriber data base is found out on the basis of a subscriber number indexed according to the invention, FIG. 3 is a general diagram of a numbering domain which is formed by index numbers and which is divided into blocks according to the invention, and FIG. 4 is a flow chart of the method of the invention, implemented by a mobile communication system of the invention.

DETAILED DESCRIPTION OF THE INVENTION

Figure 5:
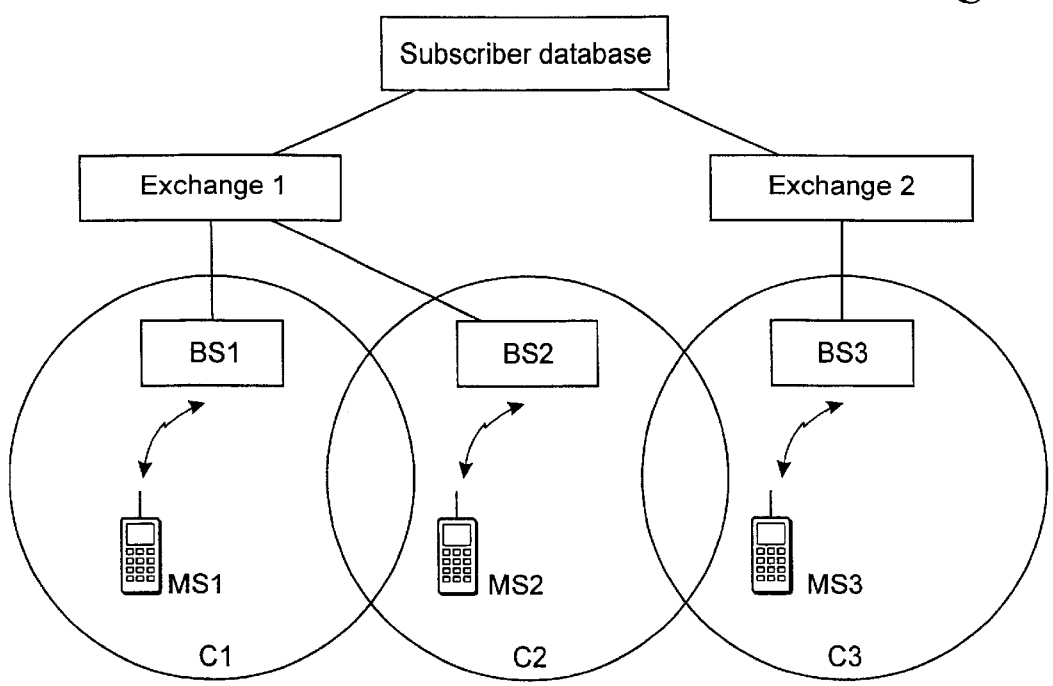
FIG. 5 is a pictorial diagram showing the basic components of a conventional mobile communication system.

FIG. 1 illustrates an arrangement of the invention for interpreting subscriber identifiers. The figure shows a subscriber identifier, in this case a subscriber number 101. In the following step 102, the subscriber number is converted into another form, in this case into a binary number 103. A predetermined part 104 of this number is selected as an index. These indexes are shown in Table 112, where predetermined protocols correspond to the indexes 105. Each predetermined protocol consists of one or more rules. These rules are illustrated in Table 111. The rules define variables on the basis of which subscriber identifiers belonging to a predetermined block of the numbering domain are interpreted in a predetermined manner.

It can be assumed, by way of example, that the first three 104 bits 101 . . . of the subscriber number 101 (in binary form 103) correspond to protocol 108 in the table. As in Table 111, three or more rules may be defined in this protocol. In this case, the first rule (rule 1.) relates to the numbering technique. It may have the values continuous numbering or field-based numbering. The second rule (rule 2.) relates to the method for inferring the home exchange, home data base or subscriber data base, i.e. to how this exchange or data base is found out on the basis of the subscriber identifier 101. The third rule (rule 3.) defines the use of the digits, in this case bits, in the subscriber identifier, i.e. whether normal subscriber numbering is in question or whether some bits/numbers are allocated to the system.

FIG. 1 thus illustrates, by way of example, the advantage afforded by the division of the numbering domain: e.g. the division of subscriber numbers between the different exchanges of the network is made more versatile without a subscriber number being dependent on the physical structure of the network. Protocols may be organization-specific, or several blocks of the numbering domain may have the same rules.

FIG. 2 shows an example which illustrates how the location of a home exchange or a subscriber data base is found out on the basis of a subscriber number indexed according to the invention. In this case, the subscriber number is thus an example of a subscriber identifier. FIG. 2 shows a subscriber identifier 101, i.e. subscriber number 12345678. Parameters 201 are defined in the mobile communication system, i.e. parameters 202 of the mobile communication network, by which it is determined how many digits are selected for the index of the invention, and which digit is the first digit of the index. An example 203 of these parameters may be the values two and three, i.e. two digits are selected for the index, and the first digit of the index is the third digit. The original subscriber identifier is thus divided 204 into the following series of digits: 12/34/5678, where digits 3 and 4 are the digits used as the index. The home exchange, home data base or (home) subscriber data base of these subscribers can be seen from the table on the basis of the digits 3 and 4, i.e. the number 34. The global table used by all exchanges of the mobile communication network contains the different blocks of the numbering domain formed by the index numbers obtained from the subscriber numbers, and indicates which blocks are allocated to the different exchanges of the mobile communication system.

FIG. 3 shows a general table of the numbering domain which is formed by index numbers and which is divided into blocks according to the invention. The first column 301 of the table shows the division of the numbering domain formed by index numbers into blocks, or parts. Column 302 indicates the home exchange corresponding to each block of the numbering domain. In addition, FIG. 3 shows the division of a subscriber identifier 101 into fields: that digits 1 and 2 are not significant, whereas the third and the fourth digit of the identifier are significant, as they determine the block of the numbering domain allocated to the subscriber's home exchange. In the case of the example, if the third and fourth digits have values 00 to 15, the subscriber's home exchange is exchange 3. Correspondingly, if the values are 16 to 20, the number of the home exchange is 5. If the values are 21 to 66, the number of the home exchange is 1. If the values are 67 to 99, the number of the home exchange is 3. It can be seen that two blocks of the numbering domain, i.e. 00 to 15 and 67 to 99, may be allocated to the same home exchange, i.e. exchange, 3. The location of the home exchange in which the subscriber data are stored can thus be freely determined by means of the indexing of the subscriber identifier.

It is possible to keep index numbers in a fixed part of the subscriber identifier, or subscriber number: e.g. always the first two digits of a subscriber number. However, this solution does not offer as great flexibility in the case of field-based numbering, for example.

FIG. 4 is a flow chart of the method of the invention, implemented by the mobile communication system of the invention. The operation starts from step 401. After the start, the subscriber identifier is taken 402 for examination. The examination may take place at an exchange or some other part of the mobile communication system. When the subscriber identifier is examined, the part forming the actual index of the invention is picked 403 out of the identifier. This part may be certain digits or bits in the subscriber identifier: e.g. always the first two digits or first two bits, or the third and fourth digit or corresponding bits. On the basis of the part of the subscriber identifier forming the index, the protocol indicated by the index is then selected 404 according to the invention. This is described in greater detail in connection with FIG. 1. In step 405, it is examined whether the identifier belongs to any protocol. If the identifier belongs 406 to a protocol, the identifier is analyzed in step 407 according to rule i, whereby (i=1 . . . N). In step 408, it is examined whether the rule in question is the last rule of the protocol. If this is not the case, the process returns 409 to step 407. If the rule is 410 the last rule of the protocol, the necessary further operations utilizing the subscriber identifier are performed in step 411 according to the results of the analysis. Thereafter the processing ends in step 412. Alternatively, if it is found in step 405 that the identifier does not 413 belong to any protocol, step 414 is proceeded to. Identifiers not belonging to any protocols may be, for instance, emergency numbers and alias numbers used in the system. In step 414, further operations utilizing the subscriber identifier are performed according to the use of the identifier. When these operations have been performed, the method proceeds to the end 412.

The drawings and the description relating to them are intended merely to illustrate the inventive concept. In its details, the mobile communication system of the invention may be modified within the scope of the claims. Although the invention has been described above mainly with reference to a PMR mobile communication system, it may also be applied to other types of mobile communication systems.

It should also be noted that the division of the numbering domain according to the invention can be implemented with all numbers, e.g. binary numbers, decimals, etc. The use of binary numbers expedites the inference.

What is claimed is:

1. A mobile communication system which is in shared use by a plurality of user organizations, comprising:

subscribers provided with identifiers, at least two exchanges, a numbering domain allocated to the mobile communication system; said numbering domain comprising subscriber identifiers, wherein:

numbering ranges are allocated from the numbering domain to user organizations of the mobile communication system in such a manner that the subscriber data of the subscribers of a user organization are positioned in a distributed manner in different exchanges of the mobile communication system, a predetermined part of the identifier of each subscriber forms an index which refers to a predetermined protocol to be applied to said identifier, said protocol consists of one or more rules, and said rules define variables on the basis of which subscriber identifiers belonging to a predetermined block of the numbering domain are interpreted in a predetermined manner.

2. A system according to claim 1, wherein said variable discloses the inference method to be used in the mobile communication system for finding out the location of a subscriber data base on the basis of the subscriber identifier.

3. A system according to claim 2, wherein said location of the subscriber data base is inferred indirectly by means of an index pointer provided in a predetermined manner in the subscriber identifier.

4. A system according to claim 3, wherein said location data of the subscriber data base is retrieved by means of said index pointer from a table formed on the basis of the values of said index pointer (FIG. 3).

5. A system according to claim 1, wherein said variable discloses the structure of the subscriber identifiers used in the mobile communication system.

6. A system according to claim 5, wherein the subscriber identifiers belonging to a given block of the numbering domain have a structure comprising one field.

7. A system according to claim 5, wherein in their structure, the subscriber identifiers belonging to a given block of the numbering domain are divided into a plurality of predetermined fields, each of said fields being interpreted separately.

8. A system according to claim 1, wherein said variable discloses the use of a given block of the numbering domain of the mobile communication system.

9. A system according to claim 8, wherein a given block of the numbering domain is allocated to user organizations of the mobile communication system for normal subscriber identifiers.

10. A system according to claim 8, wherein a given block of the numbering domain is allocated to the mobile communication system for special numbers of special functions.

* * * * *